United States Patent [19]

Bedell et al.

[11] Patent Number: 4,808,284

[45] Date of Patent: Feb. 28, 1989

[54] PROCESS FOR THE RECOVERY OF ALKANOLAMINES FROM THEIR HEAT-STABLE SALTS FORMED DURING ABSORBENT THERMAL REGENERATIVE STEP OF GAS CONDITIONING PROCESSES

[75] Inventors: Stephen A. Bedell, Lake Jackson; Susan S. Kuan Tsai, Pearland, both of Tex.

[73] Assignee: The Dow Chemical Company, Midland, Mich.

[21] Appl. No.: 149,777

[22] Filed: Jan. 29, 1988

[51] Int. Cl.$^4$ .......................... C25B 3/00; C25B 1/00; C25F 7/02
[52] U.S. Cl. ........................................ 204/72; 204/91; 204/130; 204/284; 204/290 R; 204/290 F; 204/292; 204/294; 204/265; 423/228; 423/229
[58] Field of Search ............. 204/265, 257, 91, 290 R, 204/290 F, 292, 294, 130, 131, 72, 284; 423/228, 229

[56] References Cited

U.S. PATENT DOCUMENTS

| | | | |
|---|---|---|---|
| 2,983,656 | 5/1961 | Crean | 204/257 X |
| 3,278,403 | 10/1966 | Gardella et al. | 204/91 |
| 4,180,444 | 12/1979 | Merkl | 204/91 |
| 4,478,696 | 10/1984 | Allen | 204/265 X |
| 4,595,465 | 6/1986 | Ang et al. | 204/265 X |
| 4,605,475 | 8/1986 | Roberts et al. | 204/265 X |

*Primary Examiner*—Donald R. Valentine
*Attorney, Agent, or Firm*—G. R. Baker

[57] ABSTRACT

There is described a simple two compartment electrochemical cell which may be associated in multiples in parallel for electrochemically freeing alkanolamines of the heat stable salt forming anions found or formed in acid gas conditioning thermal regenerative sorbent processes using alkanolamines as sorbents for acid gases, the cell having an anion exchange membrane separating the cell into two compartments and an anode comprised of platinum or a platinum coated electroconductive metal electrode.

4 Claims, No Drawings

PROCESS FOR THE RECOVERY OF ALKANOLAMINES FROM THEIR HEAT-STABLE SALTS FORMED DURING ABSORBENT THERMAL REGENERATIVE STEP OF GAS CONDITIONING PROCESSES

BACKGROUND OF THE INVENTION

The prior art is aware that in the conditioning of natural and synthetic gases to remove the acid gases such as hydrogen sulfide, carbon dioxide, carbonyl sulfide and the like, that other acids, such as formic, sulfuric, sulfurous, thiocyanic, oxalic, chloric acids and the like, are generally also present in these gases and these acids form heat stable salts with the amine sorbents. These salts build up in the amine treating solution and must periodically be removed to maintain the overall efficiency of the amine with respect to regeneration for reuse in the absorbing process. The conventional manner for renewal of an amine sorbing solution which has become contaminated with sufficient amounts of the heat stable salts, and the like, to reduce its efficiency in pick-up of the conventionally referred to acid gases, is to transport the amine solution to a caustic treater wherein the salts are decomposed to their respective amine and acid components, the latter recovered from this process as the alkali salt of the acid. Such processes are time consuming, not readily adaptable to field unit operations on site of the absorber and are relatively expensive, particularly because of the need to transport the solution to be regenerated from the site to a caustic processing plant which to be economically viable must serve several absorber operations.

It has been known for considerable time that amine salts in general and those produced as a result of the gas conditioning of natural and synthetic gases could be regenerated by electrochemical action. For example, Shapiro, U.S. Pat. No. 2,768,945, teaches one method for separation acidic gases from aqueous alkanolamine solutions used as absorbing solutions in the gas conditioning field. The Shapiro technique uses an electrochemical treatment of a portion of the thermally regenerated sorbing solution, a side stream, in a cell which separates the anode and cathode compartments from each other by use of a porous diaphragm. The anode is graphite and the cathode is steel. The anolyte is a weak acid and the catholyte is the amine solution. In another patent, Kuo et al, U.S. Pat. No. 3,564,691 the electrolytic conversion of amine salts of the principle acid gases, such as hydrogen sulfide and carbon dioxide, is described without mention of the effect of such electrochemical conversion of the other heat stable salts, viz., the amine formates, thiocynates, sulfates, sulfites, oxalates, chlorides and the like. This patent uses a multicomPartment cell having at least one ion exchange resin-water compartment separating the electrode compartments each from intermediate compartments, which intermediate compartments include an acid compartment and product compartment, resPectively, and a central feed compartment, all defined by ion (cation or anion exchange) permeable membranes between compartments.

Neither of these processes is known to be used today, Shapiro being comparatively more expensive to operate than periodic purging of a portion of the sorbent and replenishment with virgin sorbent diluting the heat stable salt concentration to a level whereat the effect of the presence of the tied up (protonated) amine is minimized. Kuo et al is far too expensive to operate since a multiplicity of cells between electrodes increases the internal resistance of the cell increasing operating costs at least proportionally.

In co-pending application we disclosed an economical electrochemical cell and thus an economical conversion can be run in the field using the Shapiro scheme of side stream reclamation if the cell is designed as a simple two compartment cell employing specific materials of construction. Thus, an efficient cell can be produced when (a) a dimensionally stable transition metal oxide coated electrode is used as the anode, particularly iridium oxide oxide coated materials commonly used as anodes in conventional cells and (b) a single anion exchangg membrane, quaternerized functionalized polymers such as aminated polystyrene (e.g.; sold under the trademark Ionics by Ionics, Inc. or Ionac by Sybron) separating the anode and cathode compartments. The cathode may be any suitable material having electroconductivity and stable under the use environment, e.g.; porous graphite, nickel and the like.

As disclosed therein experimentation carried out in our laboratories established that a graphite anode, as used by Shapiro, is a poor material since the current densities are low, and, while nickel and steel are very good with respect to current densities (they have high current densities) they lack the stability, they dissolve or corrode under the operating conditions. Other well known anode electrode materials, such as titanium and tantalum, have been shown to have low, on the order of graphite, operating current densities. Experimentation likewise has shown that an electrode coated with ruthenium oxide has the ability to operate at high current densities, but is not long-lived enough to be commercially viable under conditions normally found ln the field, since the ruthenium is worn away in about 30 days. Iridium oxide on titanium is shown in our co-pending Application, above identified, to operate at high current densities and to be sufficiently long lived to be commercially viable. Similarly, tantalum is expected to give equivalent results when coated with iridium oxide.

BRIEF DESCRIPTION OF THE INVENTION

We have now found that platinum or a platinized conventional anode material will also function as an anode under the conditions found in converting heat stable acid salts of alkanolamines formed during the thermal regeneration step of gas conditioning processes utilizing the alkanolamines as absorbents.

As in our co-pending Application an economical electrochemical cell and thus an economical conversion can be run in the field using the Shapiro scheme of side stream reclamation if the cell is designed as a simple two compartment cell employing specific materials of construction. Thus, an efficient cell can be produced when (a) a dimensionally stable platinum or a platinized electrode is used as the anode, the base material of the latter, is any of the commonly used metals for anodes in conventional cells and (b) a single anion exchange membrane, quaternerized functionalized polymers such as aminated polystyrene (e.g. sold under the trademark Ionics by Ionics, lnc. or Ionac, e.g. Ionac MA 3475, by Sybron) separating the anode and cathode comPartments. The cathode may be any suitable material having electroconductivity and stable under the use environment, e.g., porous graphite, nickel and the like.

It has now been found that platinum or a platinized electroconductive metal may also be used as the anode for the conversion of the heat stable acid salts of alkanolamines in a cell of the design disclosed in our co-pending Application, entitled PROCESS FOR THE RECOVERY OF ALKANOLAMINES FROM THEIR HEAT-STABLE SALTS FORMED IN GAS CONDITIONG ALKANOLAMINE SORBENT, SOLUTION, filed even date herewith, Ser. No. 149,778.

DETAILED DESCRIPTION OF THE INVENTION

A cell is divided into an anode and cathode compartment by an anion exchange membrane. Ionics, Inc. 103 PZL-386, the cathode is porous graphite and the anode is a platinized expanded titanium sheet. The catholyte solution, 5.95 g. of methyldiethanolamine and 2.01 g. of 88% formic acid in 500 ml. of water, initial pH of about 4.89, is pumped through the porous graphite cathode at a rate of about 300 ml/m. The anolyte solution, consisting of 500 ml. of a 0.10M aqueous solution of NaCl, is fed to the anode compartment. A D.C. power supply, connected across the electrodes. provides the power to the cell. Such a cell operates at economically attractive current densities and provides a commercially viable process for converting the heat stable salts of alkanolamines formed in the thermal regenerator of a conventional gas conditioning process to the free amine which can be recycled to the gas conditioning process.

We claim:

1. In an alkanolamine sorbent gas conditioning process for the removal of acid gases from natural and synthetic gas streams containing one or more of said acid gases ans in which process heat stable salts of alkanolamine consisting of formates, sulfites, oxalates, thiocyanates and chlorides of alkanolamines are formed, the principle process units of said process being an absorber and a thermal regenerator, the improvement which consists of
   (a) treating a portion, a side tream of less than the total, of the lean regenerated amine sorbent solution produced in the thermal regenerator of said gas conditioning process, in an electrochemical cell or cells each cell comprised of
      (i) a container separated into two compartments by an anion exchange membrane, one of said compartments, the cathode compartment, having an electroconductive expanded metal plate cathode connected to a power source and the other compartment, the anode compartment, having an anode similarly connected to a power source, the latter electrode, the anode, is selected from the group consisting of platinium or an electrically conductive metal coated with a platinium coating, platinized, both of which are capable of operating at high current density in an electrochemical cell and stable for at least 5000 hours of use,
   (b) feeding the side stream identified in (a) to the cathode compartment as the catholyte and
   (c) withdrawing from said cathode compartment a lower concentration heat stable salt lean sorbent having less concentration of heat stable salts than the lean sorbent side stream entering said compartment,
   (d) mixing the so treated lower concentration heat stable salt lean sorbent with the portion of the lean regenerated amine identified in (a) not treated in the electrochemical cell and returning the combined streams to the absorber in said process, said anode compartment containing an anolyte being an aqueous solution of an alkali metal salt capable of reacting with the afore described anions of said heat stable salts, and
   (e) maintaining the concentration of ionized alkali metal in said anode compartment at a level to neutralize said anions of said heat stable salts in said stream,
   (f) periodically discarding a portion of said anolyte and
   (g) adding make up volumes of anolyte composition to said anode compartment to maintain said concentration.

2. In the process of claim 1 wherein said anodes are expanded electroconductive metal plates coated with platinum.

3. In the process of claim 1 wherein the anode is a platinium plate.

4. In the process of claim 1 wherein the anode is selected from the group consisting of titanium or tantalum coated with platinum and said cathode is porous carbon.

* * * * *

UNITED STATES PATENT AND TRADEMARK OFFICE
CERTIFICATE OF CORRECTION

PATENT NO. : 4,808,284

DATED : Feb. 28, 1989

INVENTOR(S) : Bedell et al.

It is certified that error appears in the above-identified patent and that said Letters Patent is hereby corrected as shown below:

Col. 1, line 11; insert a comma --,-- between "hydrogen sulfide" and "carbox dioxide".

Col. 1, line 14; insert a comma --,-- between "the like" and "are generally".

Col. 1, line 39; change "separation" to --separating--.

Col. 1, line 48; change "3,564,691" to --3,554,691,--.

Col. 1, lines 48 and 49; change "electrolytio" to --electrolytic--.

Col. 1, line 50; change "oarbon" to --carbon--.

Col. 1, line 53; change "thiocynates" to --thiocyanates--.

Col. 1, line 55; change "comPartment" to --compartment--.

Col. 1, line 59; change "resPectively" to --respectively--.

Col. 2, line 13; delete "oxide" between "oxide" and "coated".

UNITED STATES PATENT AND TRADEMARK OFFICE
CERTIFICATE OF CORRECTION

PATENT NO. : 4,808,284
DATED : Feb. 28, 1989
INVENTOR(S) : Bedell et al.

It is certified that error appears in the above-identified patent and that said Letters Patent is hereby corrected as shown below:

Col. 2, line 15; change "changg" to --change--.

Col. 2, line 15; change "quaternerized" to --quaternized--.

Col. 2, line 17; change all three "lonics" to --Ionics--.

Col. 2, line 35; replace the period "." between "densities" and "but" with a comma --,--.

Col. 2, line 36; change "ln" to --in--.

Col. 2, line 39; replace the period "." between "Application" and "above" with a comma --,--.

Col. 2, line 59; replace the period "." between "anode" and "the" with a comma --,--.

Col. 2, line 62; change "quaternerized" to --quaternized--.

Col. 2, line 64; change "lnc." to --Inc--.

UNITED STATES PATENT AND TRADEMARK OFFICE
CERTIFICATE OF CORRECTION

PATENT NO. : 4,808,284
DATED : Feb. 28, 1989
INVENTOR(S) : Bedell et al.

It is certified that error appears in the above-identified patent and that said Letters Patent is hereby corrected as shown below:

Col. 2, line 64; change the two "lonac" in this line to --Ionac--.

Col. 2, lines 65 and 66; change "comPartment" to --compartment--.

Col. 3, line 8; change "CONDITIONG" to --CONDITIONING--.

Col. 3, line 8; delete the comma "," after "SORBENT".

Col. 3, line 9; change "SOLUTION" to --SOLUTIONS--.

Col. 3, line 15; replace the period "." between "membrane" and "Ionics" with a comma --,--.

Col. 3, line 15; change "lnc." to --Inc.--.

Col. 3, line 18; change "2.01" to --2.61--.

Col. 3, line 24; replace the period "." between "electrodes" and "provides" with a comma --,--.

UNITED STATES PATENT AND TRADEMARK OFFICE
CERTIFICATE OF CORRECTION

PATENT NO. : 4,808,284

DATED : Feb. 28, 1989

INVENTOR(S) : Bedell et al.

It is certified that error appears in the above-identified patent and that said Letters Patent is hereby corrected as shown below:

Col. 3, line 35; change "ans" to --and--.

Col. 3, line 41; change "tream" to --stream--.

Col. 4, line 27; remove the space between "afore" and "described" so it will read "aforedescribed".

Signed and Sealed this

Tenth Day of December, 1991

Attest:

HARRY F. MANBECK, JR.

*Attesting Officer*     *Commissioner of Patents and Trademarks*